United States Patent
Carter et al.

(10) Patent No.: US 8,434,746 B2
(45) Date of Patent: May 7, 2013

(54) INDUCED DRAFT COOLING TOWER

(75) Inventors: Thomas P. Carter, Montgomery, MD (US); Kurt Geens, Booischot (BE)

(73) Assignee: Baltimore Aircoil Company, Inc., Jessup, MD (US)

( * ) Notice: Subject to any disclaimer, the term of this patent is extended or adjusted under 35 U.S.C. 154(b) by 384 days.

(21) Appl. No.: 12/803,650

(22) Filed: Jul. 2, 2010

(65) Prior Publication Data
US 2012/0001352 A1 Jan. 5, 2012

(51) Int. Cl.
*B01F 3/04* (2006.01)

(52) U.S. Cl.
USPC ............. 261/155; 261/160; 261/DIG. 11

(58) Field of Classification Search ............ 261/153, 261/155, 157, 160, DIG. 11
See application file for complete search history.

(56) References Cited

U.S. PATENT DOCUMENTS

| | | | | |
|---|---|---|---|---|
| 3,782,451 A | * | 1/1974 | Cates | 165/283 |
| 3,923,935 A | * | 12/1975 | Cates | 261/159 |
| 3,994,999 A | * | 11/1976 | Phelps | 261/159 |
| 4,076,771 A | * | 2/1978 | Houx et al. | 261/159 |
| 4,098,854 A | * | 7/1978 | Knirsch et al. | 261/161 |
| 4,315,873 A | * | 2/1982 | Smith et al. | 261/158 |
| 4,367,183 A | * | 1/1983 | Carbonaro | 261/159 |
| 4,380,910 A | * | 4/1983 | Hood et al. | 62/91 |
| 7,310,958 B2 | * | 12/2007 | Carter et al. | 62/171 |
| 7,887,030 B2 | * | 2/2011 | Hentschel et al. | 261/109 |

FOREIGN PATENT DOCUMENTS

JP   52-59352   * 5/1977

\* cited by examiner

*Primary Examiner* — Charles Bushey

(74) *Attorney, Agent, or Firm* — Edward J. Brosius

(57) ABSTRACT

A cooling tower or, in alternate operation an evaporative condenser, is provided having a dry sensible or indirect heat exchange section and an evaporative heat exchange section. The dry sensible section includes a coil circuit through which a liquid to be cooled passes. The evaporative section is below the dry sensible section and may include a coil circuit or fill sheets. Modulating louvers are provided to allow the air flow and accordingly the evaporative loading to be varied between the dry sensible section and the evaporative section.

14 Claims, 2 Drawing Sheets

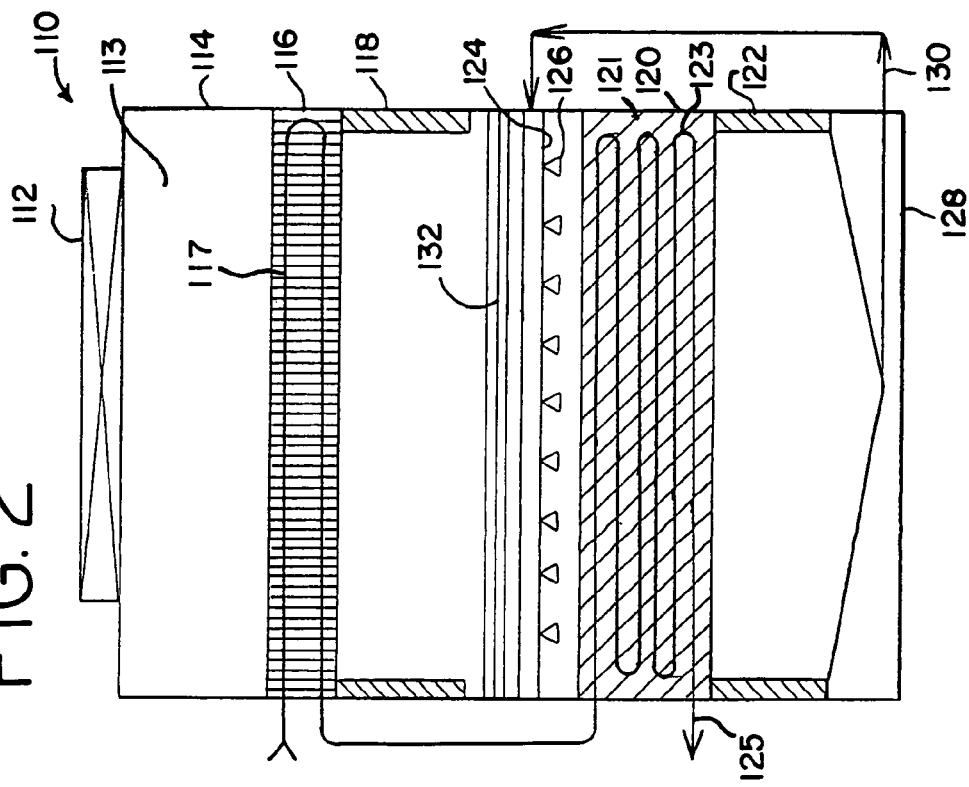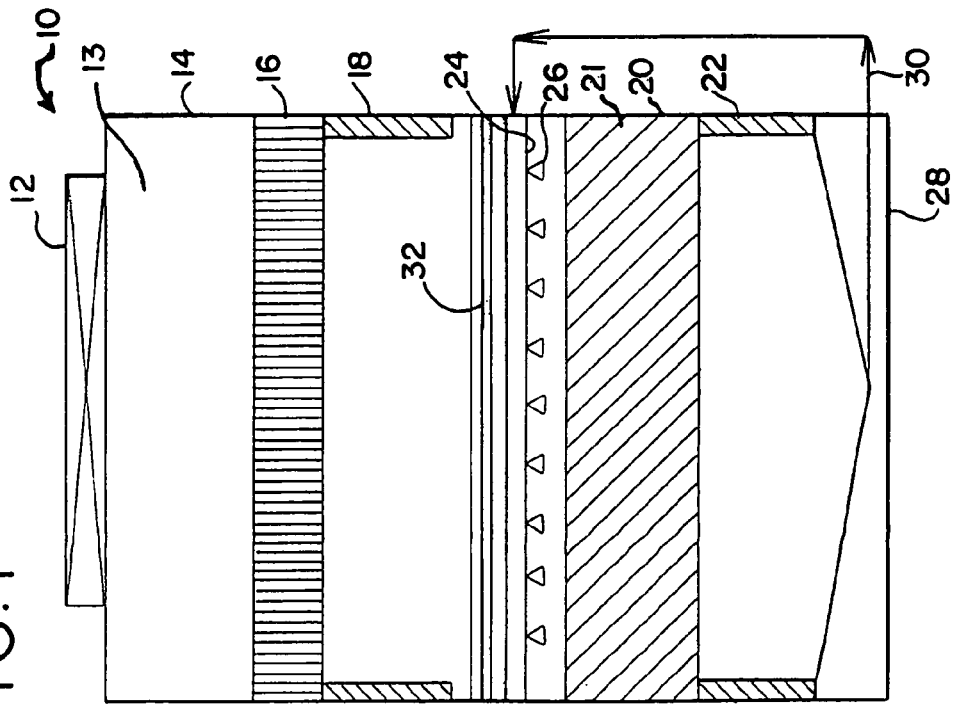

8,434,746 B2

INDUCED DRAFT COOLING TOWER

BACKGROUND OF INVENTION

The present invention relates generally to a heat exchange apparatus such as cooling tower or evaporative condenser. More specifically, the present invention relates to a water saving cooling tower including a dry sensible heat exchange section and an evaporative heat exchange section.

In cooling towers comprising dry sensible and evaporative heat exchange sections, it is desirable to optimize the performance of the cooling tower depending on the ambient temperature and other conditions. In cooling towers having a dry sensible heat exchange section above the evaporative heat exchange section, typically the exhaust air is drawn across and upwardly by a fan. One drawback of such cooling towers is that the dry sensible heat exchange section usually provides a relatively fixed sensible cooling capacity percentage relative to the total cooling capacity of the cooling tower. It is desirable to allow the sensible heat exchange section to take on a greater percentage of the total cooling load, especially as the ambient temperatures drop or the total cooling load on the cooling tower decreases.

Accordingly, it is an object of the present invention to provide a water saving cooling tower having a dry sensible heat exchange section and an evaporative heat exchange section whereby the cooling percentage of the total load provided by the cooling tower in the dry sensible heat exchange section can be readily increased.

SUMMARY OF INVENTION

In typical operation of a dry sensible heat exchange section as part of a cooling tower, an initially hot fluid, usually water, is directed downwardly through a series of circuits which comprise the dry sensible heat exchange section. The hot water undergoes indirect sensible heat exchange with a counter flowing air stream drawn through the cooling tower by a fan mechanism. Such operation is typically referred to as dry coil operation whereby the sensible cooling to the water or other liquids passing within the dry sensible heat exchange section coils are cooled by the air alone.

An evaporative heat exchange section is located below the dry sensible heat exchange section. The evaporative heat exchange section typically is comprised of a series of closed circuits arranged in a spaced and adjacent configuration such that fluid to be cooled, usually water, travels downwardly within the circuits. An evaporative liquid, usually water, is sprayed downwardly across the circuits in a manner such that the water is spread evenly across the entire outside surfaces of each circuit and picks up heat from the fluid inside the circuits. Air that provides cooling to the evaporative liquid falling downwardly over the circuits is drawn counter to the flowing evaporative liquid by fan mechanism. In this evaporative process energy is transferred from the evaporative liquid to the air stream by a combination of heat and mass transfer processes. The evaporative liquid is then collected in a sump, which is then redistributed to the top of the evaporative heat exchange section. This is typically called a closed circuit cooling tower.

In an alternative operation of the cooling tower, operation may by as an evaporative condenser. In such manner, a gas to be condensed is passed through the dry sensible heat exchange section coils whereby the cooling air drawn across the such dry sensible heat exchange section by the fan results in the desuperheating and partial condensing of the gas. The remainder of the gas is condensed in the evaporative heat exchanger. In yet another alternative operation of the cooling tower, operation may be as an open cooling tower. In typical operation of a dry sensible heat exchange section as part of an open cooling tower, an initially hot fluid, usually water, is directed downwardly through a series of circuits which comprise the dry sensible heat exchange section. The fluid is then sprayed directly over a direct contact evaporative heat exchanger media, typically comprised of spaced fill sheets, where it is further cooled in a combined heat and mass transfer process with the counter flowing air. The cooled fluid is then collected in a sump, and then pumped out to a process where it picks up heat to be circulated back to the tower.

In order to allow the dry sensible heat exchange section to increase its cooling percentage of the total cooling by the cooling tower, the sides of the tower below the dry sensible heat exchanger and above the evaporative heat exchanger are replaced with modulating louvers. The modulating louvers or dampers can be opened to increase the air flow across the dry sensible heat exchange section, typically as the ambient temperatures drop or the total cooling load on the tower decreases. This increases both the total air flow through the tower and the relative percentage of air across the dry sensible heat exchange section coil which increase the dry sensible coils' cooling capacity. Simultaneously it also reduces the relative air flow across the evaporative heat exchange section and reduces the capacity of the evaporative heat exchange section. Accordingly, a greater portion of the total cooling load is provided by the dry sensible heat exchange coil which operates as a dry coil, and saves an amount of water evaporated to provide cooling in the total cooling tower itself.

BRIEF DESCRIPTION OF DRAWINGS

In the drawings,

FIG. 1 is a schematic view of a cooling tower in accordance with an embodiment of the present invention;

FIG. 2 is a schematic view, of a cooling tower in accordance with a second embodiment of the present invention;

DETAILED DESCRIPTION OF THE INVENTION

Figure 3:
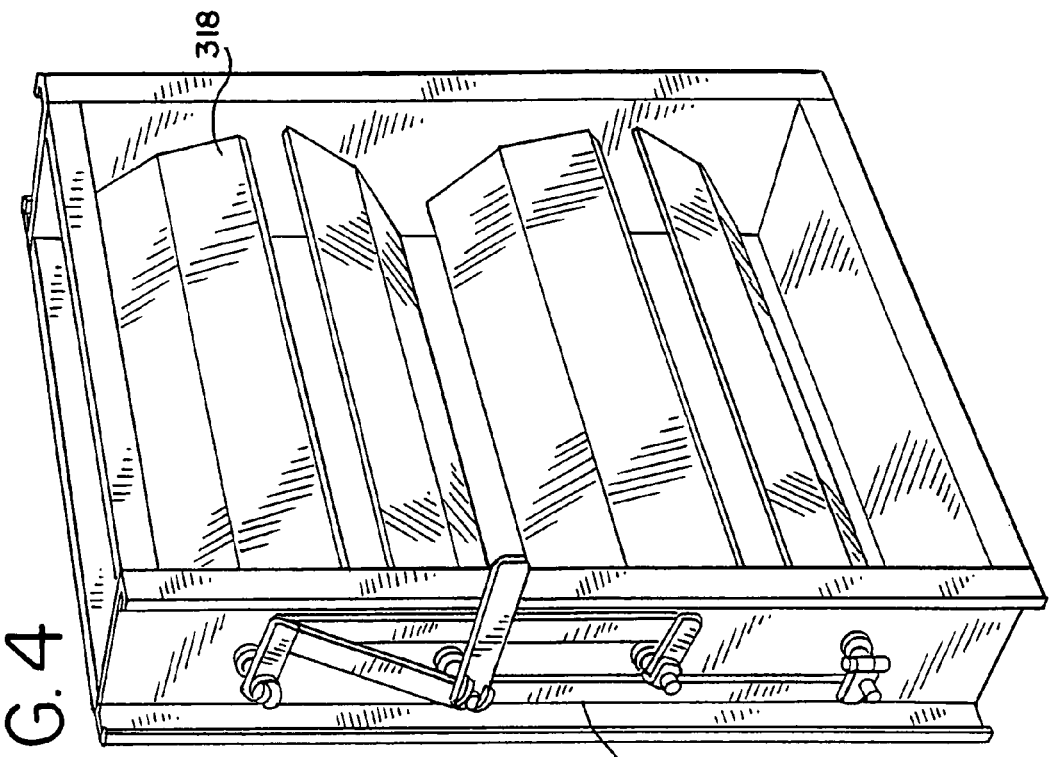
FIG. 3 is a schematic view of a cooling tower in accordance with a third embodiment of the present invention.

Referring now to FIG. 1 of the drawings, a cooling tower is shown generally at 10. Such cooling tower is an induced draft tower as fan 12 and fan plenum 13 are generally located at the top of the cooling tower thereby drawing air through inlets 18, 22 located at the sides of the cooling tower. The cooling tower itself is seen to be a generally rectangular structure, usually comprised of galvanized steel or stainless steel structural components. Upper section 14 of cooling tower 10 is seen to comprise a dry sensible cooling coil section 16. Modulating louvers 18 are located in the sides of cooling tower 10, thereby allowing the air flow through modulating louvers 18 to be adjusted from basically full air passage to, upon closing of such louvers, no air passage.

Lower section 20 of cooling tower 10 is seen to comprise an evaporative cooling section 21. Such evaporative section typically is comprised of a series of spaced parallel closed circuits or fill sheets, designed to have an evaporative liquid fall across such circuits or fill sheets. Such fill sheets usually are comprised of a poly vinyl chloride or similar plastic and are usually of a rectangular shape. Overall, the sheets are of a flat configuration, but various wave and groove patterns are utilized. Sump 28 is seen to collect the evaporative liquid, typically water. In a closed circuit cooling tower or an evaporative condenser this evaporative liquid in the sump is pumped upwardly through water supply line 30 to water distribution line 24. In an open cooling tower the evaporative liquid in the sump is pumped to a heat exchanger where it picks up heat to be rejected from a process. The heated water then returns to the dry sensible heat transfer section where it is partially cooled. The process fluid then flows to the water distribution line 24. In an open cooling tower, the process fluid and the evaporative fluid are one in the same. A plurality of spray nozzles 26 extend from water distribution line 24 in a spaced arrangement such that the evaporative liquid, typically water, is sprayed across the entire top surface of the evaporative coil or fill section 21. It should be understood that separate nozzles may not be utilized, but in an alternate embodiment, openings in water distribution line 24 may be designed and configured that result in water being sprayed from water distribution line 24. Other equivalents to nozzles or openings may also be utilized. Air inlet louvers 22 are provided generally below evaporative cooling section 21. These louvers are typically open to air flow, but can also be modulated to allow the air flow to be adjusted from full air flow to, upon closing of such louvers, zero flow. Drift eliminators 32 prevent the evaporative liquid sprayed from nozzles 26 from being drawn into the upper section 14 of the cooling tower.

Referring now to FIG. 2 of the drawings, a cooling tower is shown generally at 110. Such cooling tower is an induced draft tower as fan 112 and plenum 113 are generally located at the top of the cooling tower thereby drawing air through inlets 118, 122 located at the sides of the cooling tower. The cooling tower itself is seen to be a generally rectangular structure, usually comprised of galvanized steel or stainless steel structural components.

Upper section 114 of cooling tower 110 is seen to comprise a dry sensible cooling coil section 116 having coil 117. This coil 117 receives a liquid, usually water, from a process that imparts heat to the liquid. As the liquid passes through coil 117, the liquid in the coil is indirectly cooled by the air being drawn across upper portion of coil 117 by fan 112. Modulating louvers 118 are located in the sides of cooling tower 110, thereby allowing the airflow in through modulating louvers 118 to be adjusted from basically full air passage to, upon closing modulating louvers 118, no air passage. Accordingly, the cooling load of coil 117 can be adjusted from a large portion of the total cooling load of cooling tower 110, with modulating louvers 118 fully open, to a small portion of the total cooling load of cooling tower 110, with modulating louvers 118 closed.

Lower section 120 of cooling tower 110 is seen to comprise an evaporative cooling section 121. Evaporative cooling section 121 is comprised of a cooling coil section 123 which includes a series of closed circuits for further indirect cooling of the liquid passing into cooling coil section 123 from cooling coil 117. An evaporative liquid, usually water, falls across cooling coil section 123. Sump 28 collects the evaporative liquid.

In a closed circuit cooling tower or an evaporative condenser, the evaporative liquid is pumped upwardly through water supply line 130 to water distribution line 124.

A plurality of spray nozzles 126 extend from openings in water distribution line 124 in a spaced arrangement such that the evaporative liquid is sprayed across the entire top surface of cooling coil 123. It should be understood that separate nozzles may not be utilized, but in an alternate embodiment, openings in water distribution line 124 may be designed and configured that result in water being sprayed or otherwise distributed from water distribution line 124. Other functional equivalents to nozzles or openings may also be utilized. Cooled or condensed liquid exits cooling coil 123 at 125. An air inlet louver 122 is provided generally below evaporative cooling section 121. Louvers 122 are typically open to air flow, but can also be modulated to allow the air flow to be adjusted from full air flow to, upon closing of louvers 122, zero air flow. Drift eliminators 132 prevent the evaporative liquid sprayed from nozzles 126 from being drawn into the upper section 114 of the cooling tower.

Referring now to FIG. 3 of the drawings, a cooling tower is shown generally at 210. Such cooling tower is an induced draft tower as fan 212 and fan plenum 213 are generally located at the top of the cooling tower thereby drawing air through inlets located at the sides of the cooling tower.

The cooling tower itself is seen to be a generally rectangular structure, usually comprised of galvanized steel or stainless steel structural components.

Upper section 214 of cooling tower 210 is seen to comprise a dry sensible cooling coil section 216 having the coil 217. This coil 217 receives a liquid, usually water, from a process that imparts heat to the liquid. As the liquid passes through coil 217, the liquid in coil 217 is indirectly cooled by the air being drawn across coil 217 by fan 212. Modulating louvers 218 are located in the sides of cooling tower 210, thereby allowing the air flow through modulating louvers 218 to be adjusted from basically full air passage to, upon closing modulating louvers 218, no air passage. Accordingly, the cooling load of coil 217 can be adjusted from a large portion of the total cooling load of cooling tower 210, with modulating louvers 218 fully open, to a small portion of the total cooling load of cooling tower 210, with modulating louvers 218 closed.

Lower section 220 of cooling tower 210 is seen to comprise an evaporative cooling section 221. Evaporative cooling section 221 is comprised of a fill section 223 which includes a series of spaced fill sheets for direct cooling of the liquid from coil 217, which passes through connection 238 to fall across fill section 223. A plurality of spray nozzles 226 extend from water distribution line 224 in a spaced arrangement such that the evaporative liquid from connection 238 is sprayed across the entire top surface of fill section 223. It should be understood that separate nozzles may not be utilized, but in an alternate embodiment, openings in water distribution line 224 may be designed and configured that result in water being sprayed or otherwise distributed from water distribution line 224. Other functional equivalents to nozzles or openings may also be utilized. Sump 228 collects the evaporative liquid falling from fill section 223. The evaporative liquid is pumped outwardly through water supply line 230 to be again used in a cooling operation such as a water cooled condenser. Drift eliminators 232 prevent the evaporative liquid sprayed from nozzles 226 from being drawn into the upper section 214 of the cooling tower.

Air inlet louvers 222 are provided generally below evaporative cooling section 221. Louvers 222 are typically open to air flow, but can also be modulated to allow the air flow to be adjusted from full air flow to, upon closing the louvers 222, zero air flow.

Figure 4:
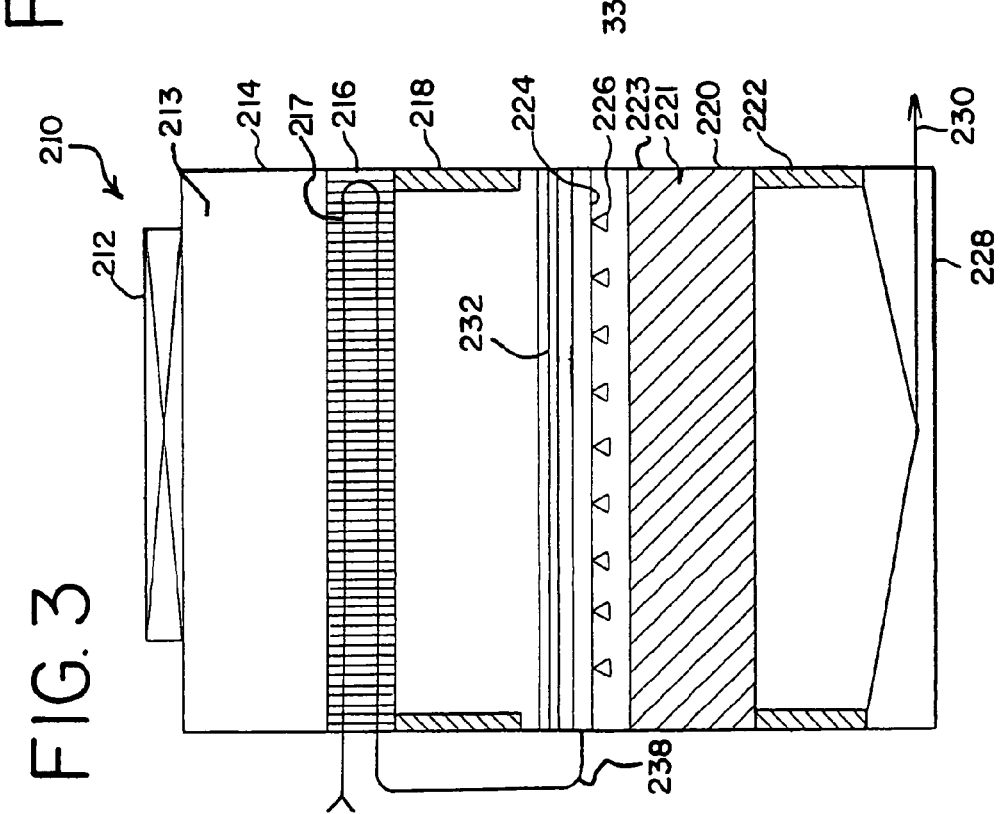
FIG. 4 is a detailed view of a modulating louver in accordance with an embodiment of the present invention.

Referring now to FIG. 4, modulating louvers 318 are shown in detail. Mechanical controls 338 are seen to readily be able to open and close modulating louvers 318 to either allow complete airflow therethrough or to basically stop airflow from entering the upper section.

What is claimed is:

1. A combination sensible and evaporative cooling tower comprising an enclosure having sides and an air outlet at an upper surface thereof,
an upper section including a dry sensible heat exchange section,
a lower section including an evaporative heat exchange section,
a distribution line to convey liquid from the dry sensible heat exchange section,
the distribution line extending above the evaporative heat exchange section,
and a plurality of openings in the distribution line such that water partially cooled in the dry sensible heat exchange section can be distributed across the evaporative heat exchange section,
first air inlet louvers below the lower section to allow the passage of air into the lower section and across the evaporative heat exchange section,
second air inlet louvers below the upper section in the sides of the cooling tower to allow the passage of air into the upper section and across the dry sensible heat exchange section,
wherein the first air louvers are controllable to increase or decrease or eliminate the air flow therethrough, and
wherein the second air inlet louvers are controllable to increase or decrease or eliminate the air flow therethrough.

2. The cooling tower of claim 1 wherein the second air inlet louvers are located below the dry sensible heat exchange section.

3. The cooling tower of claim 1 wherein the dry sensible heat exchange section comprises a coil having a plurality of circuits,
and wherein the second air inlet louvers are located below the dry sensible heat exchange section.

4. The cooling tower of claim 1 wherein the evaporative heat exchange section comprises a plurality of fill sheets arranged such that the water distributed over the evaporative heat exchange section flows across a majority of a surface of each fill sheet.

5. The cooling tower of claim 1 wherein the enclosure lower section comprises a generally rectangular structure comprised of two sets of parallel walls,
and the first air inlet louvers are located in two parallel walls of the louver section,
and wherein the enclosure upper section comprises a generally rectangular structure comprised of two sets of parallel walls, and the second air inlet louvers are located in two parallel walls of the upper section.

6. The cooling tower of claim 1 wherein the second air inlet louvers can be closed to generally eliminate air flow therethrough.

7. The cooling tower of claim 1 wherein the first air louvers are controllable to increase or decrease the air flow therethrough.

8. A combination sensible and evaporative cooling tower comprising
an enclosure having sides and an air outlet,
an upper section including a dry sensible heat exchange section,
a lower section including an evaporative heat exchange section,
a distribution line to convey liquid from the sensible heat exchange,
the distribution line extending to the evaporative heat exchange section, and a plurality of openings in the distribution line such that water partially cooled in the sensible heat exchange section can be distributed across the evaporative heat exchange section,
first air inlet louvers below the lower section to allow the passage of air into the lower section and across the evaporative heat exchange section,
second air inlet louvers below the upper section in the sides of the cooling tower to allow the passage of air into the upper section and across the dry sensible heat exchange section,
wherein the first air louvers are controllable to increase or decrease or eliminate the air flow therethrough, and
wherein the second air inlet louvers are controllable to increase or decrease or eliminate the air flow therethrough.

9. The cooling tower of claim 8 wherein the second air inlet louvers are located below the dry sensible heat exchange section.

10. The cooling tower of claim 8 wherein the dry sensible heat exchange section comprises a coil having a plurality of circuits,
and wherein the second air inlet louvers are located below the dry sensible heat exchange section.

11. The cooling tower of claim 8 wherein the evaporative heat exchange section comprises a plurality of fill sheets arranged such that the water distributed over the evaporative heat exchange section flows across a majority of a surface of each fill sheet.

12. The cooling tower of claim 8 wherein the enclosure lower section comprises a generally rectangular structure comprises of two sets of parallel walls,
and the first air inlet louvers are located in two parallel walls of the louver section,
and wherein the enclosure upper section comprises a generally rectangular structure comprised of two sets of parallel walls of the upper section.

13. The cooling tower of claim 8 wherein the second air inlet louvers can be closed to generally eliminate air flow therethrough.

14. The cooling tower of claim 8 wherein the first air louvers are controllable to increase or decrease the air flow therethrough.

* * * * *